(12) United States Patent  (10) Patent No.: US 6,742,663 B2
Chubb  (45) Date of Patent: Jun. 1, 2004

(54) SHIPPING CONTAINER FOR FRANGIBLE PANELS

(75) Inventor: Richard S. Chubb, Gloucester City, NY (US)

(73) Assignee: Thermoseal Glass Corp., Gloucester, NJ (US)

( * ) Notice: Subject to any disclaimer, the term of this patent is extended or adjusted under 35 U.S.C. 154(b) by 0 days.

(21) Appl. No.: 10/113,468

(22) Filed: Apr. 2, 2002

(65) Prior Publication Data
US 2003/0183590 A1 Oct. 2, 2003

(51) Int. Cl.[7] .............................................. A47G 19/08
(52) U.S. Cl. .................................................. 211/41.14
(58) Field of Search ....................... 211/41.14; 206/454, 206/41.1, 41.15, 13.1

(56) References Cited

U.S. PATENT DOCUMENTS

| | | | | |
|---|---|---|---|---|
| 3,848,917 A | * | 11/1974 | O'Neal ............................ 296/3 |
| 3,878,942 A | * | 4/1975 | Hansen et al. ............... 206/454 |
| 4,278,171 A | * | 7/1981 | Millhoan ...................... 206/451 |
| 4,934,538 A | * | 6/1990 | Beyer .......................... 211/49.1 |
| 5,246,121 A | * | 9/1993 | Mitake et al. ............ 211/41.13 |
| 6,102,206 A | * | 8/2000 | Pride ........................... 206/454 |
| 6,386,376 B1 | * | 5/2002 | Mendoza-Castillo et al. .... 211/41.14 |

* cited by examiner

Primary Examiner—Alvin Chin-Shue
Assistant Examiner—Sarah Purol
(74) Attorney, Agent, or Firm—John Lezdey & Assoc

(57) ABSTRACT

The combination of a shipping container and a plurality of parallel planar panels having a pallet with a horizontal platform frame perpendicularly fixed to a rear frame, a rear wall support which is tilted obliquely and rearwardly extending from the rear of the horizontal platform frame to the top of the rear frame and a planar rear wall attached to the rear wall support. A laminated corrugated paperboard wedge having an inclined load bearing surface in conjunction with a shipping container having an obliquely tilted and rearwardly extending rear wall which provides an economical, reusable, recyclable and efficient transport container for vertically standing parallel planar panels, such as multi-glazed glass units. The shipping container is particularly useful for transporting refrigerator and freezer doors and insulating window units.

14 Claims, 2 Drawing Sheets

SHIPPING CONTAINER FOR FRANGIBLE PANELS

1. FIELD OF THE INVENTION

The Invention relates to shipping containers for securely supporting panels such as insulating glass units, particularly multi-pane insulated glass refrigerator doors and window assemblies.

2. DESCRIPTION OF THE PRIOR ART

Commercial refrigerators and freezers such as employed in supermarkets, generally comprise a plurality of insulated glass doors, which are constructed of insulated glass units made up of two or more glass panes maintained in spread-apart relation by tubular spacers with the interior between the panes appropriately scaled. The glass unit in turn is supported within a relatively rugged outer metallic or plastic frame overlapping the periphery of the glass unit in position and for providing a decorative finished appearance to the assembly.

The refrigerator door assemblies are adapted for use in free standing refrigerators or freezer cases or built-in coolers or cabinets of the type used in retail stores to display refrigerated or frozen merchandise. A problem arises when a stack of insulated glass units are transported to the place of use. Generally the insulated units are transported, stacked in a vertically held position subjected to rough handling during transit with consequential breakage.

Various shipping containers have been proposed to support the vertically aligned glass units and guard against breakage during transportation. Among the patented shipping containers suggested for shipping glass glazed units and other fragile sheet-like articles include U.S. Pat. Nos. 2,746,667, 3,335,932, 4,320,836, 4,572,473, 4,919,277, 5,145,073, 5,174,448 and 5,641,076.

U.S. Pat. No. 6,102,206 to Pride discloses a shipping container for vertically supporting panels of insulating glass units. The patented shipping container is described as comprising a floor, a generally upright rear wall for vertically supporting a plurality of parallel glass units which intersect at approximately a right angle. The glass units are supported in planes that are perpendicular to the planes of the rear wall and the floor. The rear wall includes a plurality of spaced, generally vertically extending grooves shaped and sized to receive and support the rearward edges of parallel glass units having a range of width and sizes. Likewise, the floor also includes a contact surface comprising a plurality of spaced, generally horizontally extending grooves shaped and sized to receive and support the bottom edges of parallel glass units also having a range of width and sizes. To secure these panels in position, elongated elastic restraints such as elastic cords in which one end is anchored at or adjacent the top of the rear wall and the other end of the restraint being attached to the floor forward of the glass unit. The elastic restraints are provided along their length with a support block which is adapted to contact and to press against the forward, upper corners of a respective glass unit which forces the glass unit toward the rear wall and the floor.

However, the shipping container of the above-described patent has several drawbacks. The elastic restraints, the novel feature of the patented system, are the weakest component. From the standpoint of handling, it is more labor intensive since a support block for each glazed unit must be individually attached for loading and individually removed for unloading. Further, the remaining unused restraints which remain anchored on the pallet must be removed and stowed. If left to remain in the place they may either become broken or lost. The obvious limitation is that the elastic restraints such as elastic cords cannot stabilize heavy items such as commercial refrigerators and freezer doors and panels. Therefore, there exists a need for a shipping container capable of handling heavy panels with a simple and economical modification that can be easily loaded and unloaded both manually and by mechanical methods, which is effective in preventing breakage of the glazed units. The shipping container of the prior art has not fulfilled these needs.

SUMMARY OF THE INVENTION

Figure 1:
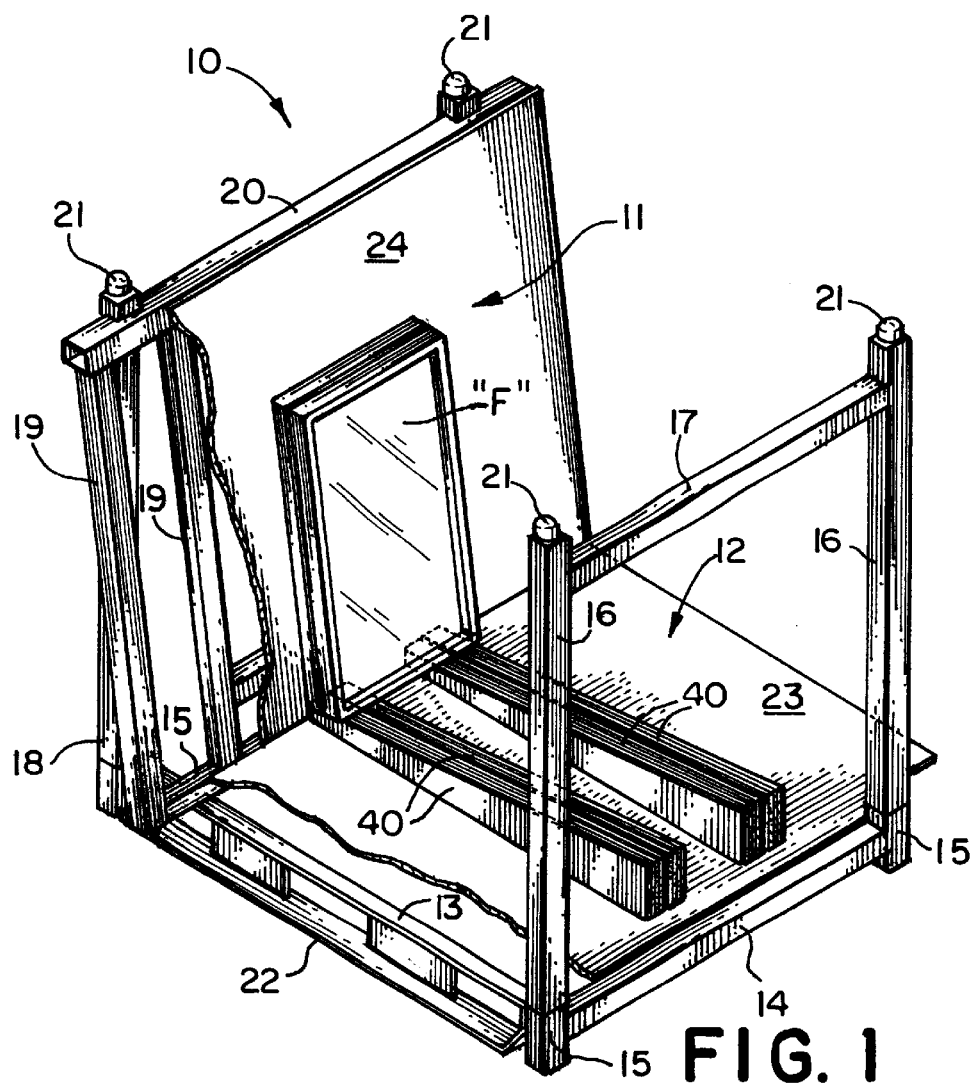
FIG. 1 is a perspective view of the shipping container of this invention carrying multi-glazed insulated refrigerator door assemblies being stacked in parallel support wedges used in conjunction with the tilted rear wall.

This invention relates to a shipping container for frangible sheets or panels such as multi-glazed insulating panels including refrigerator and freezer doors and window units that is economical, reusable, and efficient to handle providing ease of loading and unloading.

In accordance with this invention a shipping container includes a pallet and a plurality of frangible panels supported thereon, said container including:

a pallet having a horizontal base frame including a rigid planar platform area, a rear frame vertically fixed to the base frame which consists of a pair of rear vertical elongated support members in spaced relation to each other being connected by an upper horizontal cross-member, two front vertical elongated support members in spaced relation to each other which are detachably secured to the front of the base frame and each being detachably connected to an upper cross-member;

a rear wall support member fixed to the horizontal base frame and upper back cross-member having an obtuse angle to said horizontal base frame wherein said rear wall support member is tilted obliquely and rearwardly from said horizontal base frame at an obtuse angle of ninety-seven degrees;

a planar rear wall formed from a rigid sheet in contact with and supported by said rear wall support member, thereby assuming the same obtuse angle;

a plurality of support wedges, each wedge has an inclined surface, a lower back-end and a higher front end, positioned on said planar platform with the lower back end in contact with and perpendicular to the rear wall, angle of inclination is seven degrees;

a plurality of frangible planar panels positioned parallel to and adjacent one another generally upright on the load-bearing inclined surfaces of a pair of wedges so as to be slightly inclined towards and supported by the rear wall; and a bonding means for securing the plurality of parallel panels by engaging the bare frame and having it's course over the rear wall to secure the panels on the container.

In addition to the bonding means which includes either metal strips or fiberglass reinforced tapes, the resulting stack may be wrapped with a heat shrinkable plastic film or the like to hold the stack of panels together and prevent the individual panels from moving with respect to one another.

The offset of angles cancels the effect of the tilted back sheet and allows for the bottom edges of the glazed units to be at ninety degrees or normal to the It is therefore, an object of this invention to provide a shipping container for a plurality of vertically or upright positioned planar panels in which each panel is restrained against movement.

Another object of the present invention is to provide a shipping container for vertically positioned planar panels which enable planar articles of various sizes to be positioned next to one another in order to facilitate loading and unloading.

A further object of the present invention in order to provide a novel support wedge for a shipping container adapted for use with multi-layered insulating glass units.

Still another object of the present invention is to provide a support wedge adapted to support heavy multi-layered insulating glass panels which is economical, reusable, recyclable and efficient.

DETAILED DESCRIPTION OF THE PREFERRED EMBODIMENTS

In the following disclosure like numerals refer to like elements. In accordance with this invention, the shipping container 10, comprises a pallet 11, carrying a plurality of stacked in a generally upright parallel panels 30 is shown in FIG. 1.

Figure 2:
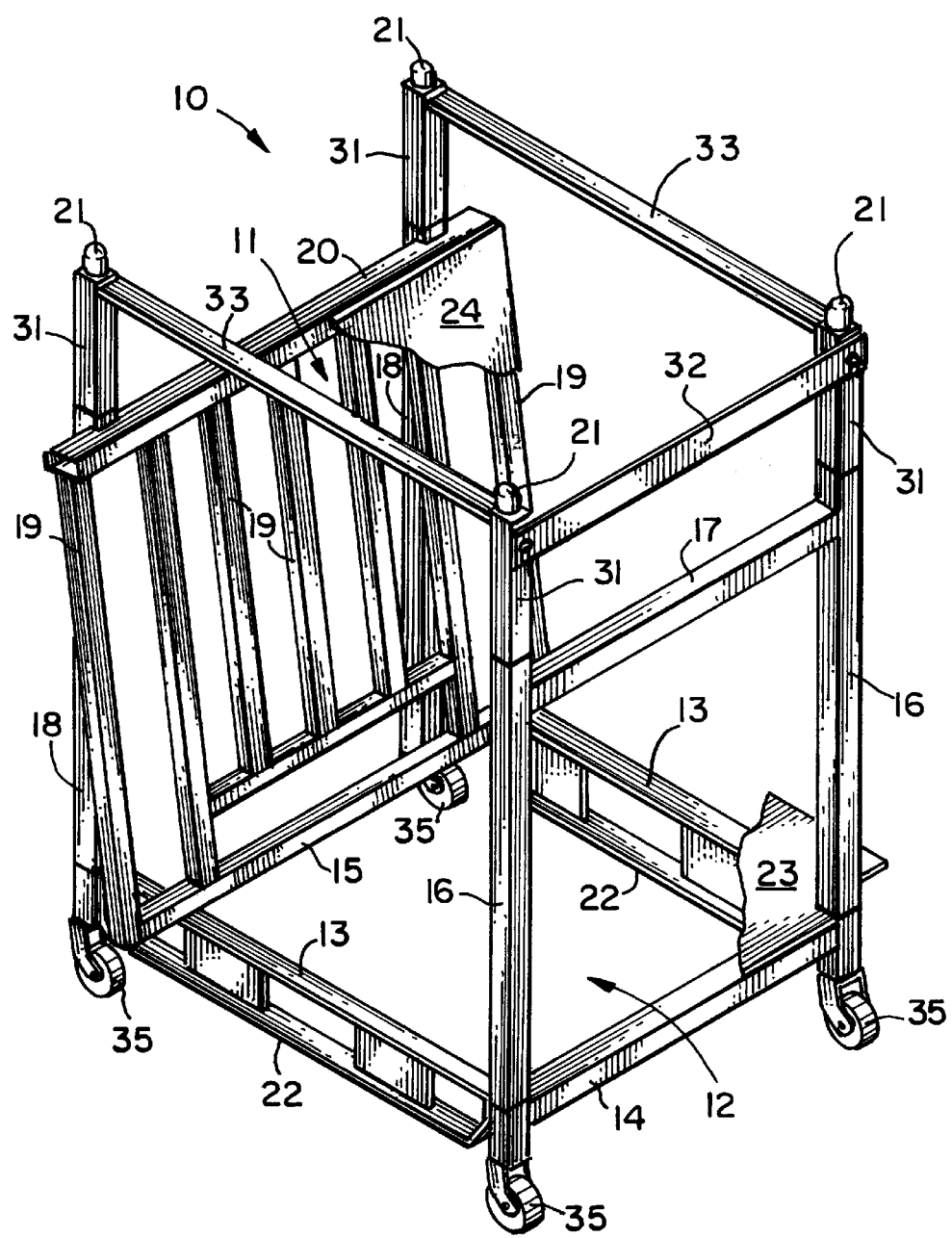
FIG. 2 is a perspective view of the pallet of FIG. 1 modified with extension supports and a cross-member support including caster wheels.

As depicted in FIGS. 1 and 2, the pallet 11, has a metal tubular framework having a structure comprising a horizontal base frame 12, of a rectangular shape having a length and width. The base frame 12, is constructed of four horizontal support members, two support members 13, along the length and a pair of support members 14, along the width of the base frame. Two base support bars 22 are welded to the bottom of each of the length support members 13. Four vertical support members are located at each of the four corners of the rectangular frame. The front two corners of the frame are provided with receptacles 15, which can accommodate the detachably vertical support members 16, which are stabilized by cross-member 17. The back vertical support members 18, are fixed in a plane perpendicular to the horizontal base frame 12 in spaced relation to each other and connected together by an upper cross-member 20. A plurality of rear wall support members 19, are fixed at suitable intervals between the horizontal base frame 14, and to the upper cross-member 20, slightly tilted rearwardly at an obtuse angle of about ninety-seven degrees. It should be understood that the open areas under base frame 12, allow for lifting by a forklift or other lifting device.

Alternatively removable caster wheels 35 (FIG. 2) are mounted in channels, which co-act with the underside of the horizontal length support member 13, to provide mobility to the shipping container. The caster wheels 35 extend slightly below the bottom plane established by the base frame 12, so that the weight of the entire shipping container and parallel panels rests upon the caster wheels. This allows the parallel panels to be moved near the point of installation without additional apparatus.

As depicted in FIG. 1, at the upper end of the four vertical support members are included knobs 21 for interlocking additional vertical extension supports. Each knob 21, has a protruding short shank and a head of greater diameter. In FIG. 2 a pallet 11, is shown with a different sized vertical extension support member 31, attached as described above with horizontal length support members 33 to provide stabilization, and additional knobs 21.

Knobs 21 for interlocking additional vertical extension supports. In FIG. 2, a pallet 11 is shown with a different sized vertical extension support member 31, attached as described above with horizontal length support members 33 to provide stabilization, and additional knobs 21.

To prepare the above-described pallet 11, of FIGS. 1 and 2 for use as a shipping container for parallel panels according to this invention, a platform and a rear wall panel must be added. Generally, a plywood sheet having a thickness between about 0.5 to about 0.75 inch sized to fit the base frame is placed thereon and forms a platform 23. A rear wall 24, is formed from at least one rigid sheet, such as corrugated cardboard or plywood and is positioned in contact with and forwardly of the rear wall support members 19. Thus, the panel 24, assumes the same backward tilt of about ninety-seven degrees as the rear wall support members. Typical sizes of the platform and the rigid sheet range from between about 43.25 to about 60 inches.

Novel support wedges of this invention are employed in pairs for each row of parallel panels and are arranged on platform 23, placed parallel and spaced apart at a sufficient distance to allow the panels to span the wedges. As shown in FIG. 1, the plurality of panels in this case, glazed units are stacked in rows parallel with the plane of rigid back sheet 24. The obtuse angle formed by backward tilt of back sheet 24, is about ninety-seven degrees and the slope of the inclined surface (load bearing surface) of the support wedge are about seven degrees. This angular difference offsets the oblique tilt of the back sheet 24, and this allows for the bottom edge of the glazed units to be at ninety degrees or normal to the load bearing surfaces of the support wedges.

Figure 3:
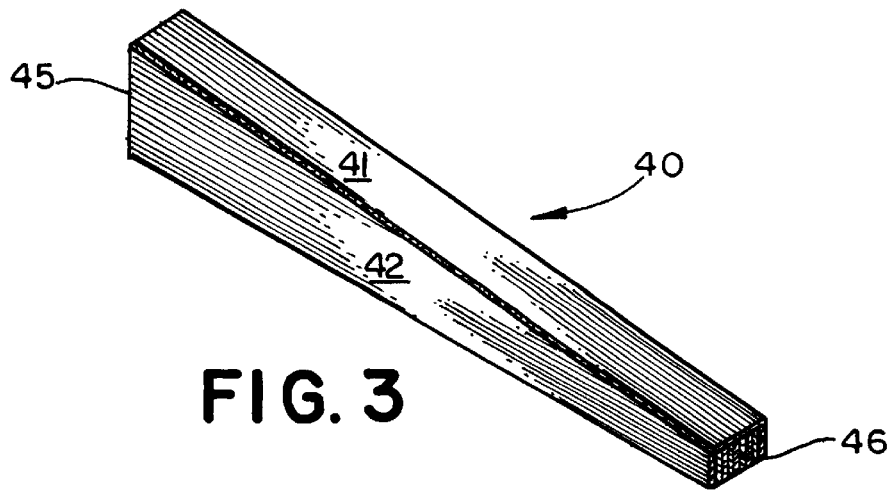
FIG. 3 is a perspective view of a vertically laminated corrugated cardboard support wedge of the present invention.

The support wedge 40, as shown in FIG. 3, is one preferred embodiment of the present invention. Wedge 40, is a lamination of a plurality of vertically positional corrugated cardboard layers. Each layer consists of a paperboard liner-corrugated cardboard filler-paperboard liner. Preferably the adhesive used for the lamination and the layers are conventional hot melt adhesives known to those in the paperboard art.

The support wedge 40, as shown in FIG. 3 has a generally right-angled triangle profile having six sides including an inclined surface, a lower back end and a higher front end side, each end side has a rectangular configuration. As depicted in FIG. 3, the four lateral sides 41, 42, 43 have closed smooth faces, while the end sides 45 and 46 have open ends. Preferably, the wedge is fabricated from paperboard, such as corrugated cardboard which has the requisite strength to resist crushing and deformation under stress. When the pair of interacting wedges are under load there is no displacement in either direction. The use of corrugated paperboard is particularly advantageous because it is compressively yieldable without being readily crushed and will, therefore, provide a cushion to absorb shocks and other vibration resulting from handling and transit container.

The support wedge can also be constructed of vertically standing rigid honeycomb structures having a plurality of cells with three sides having open faces with only the bottom side showing a smooth surface of a paperboard liner. The honeycomb structure is made from rectangular strips of sheet material such as single faced corrugated paperboard.

The support wedge is manufactured by horizontally laminating two honeycomb structures. Generally a smooth bottom surface is adhered to an open face of a component having exposed honeycomb structures by conventional securing means known to the papermaking art.

Due to this open face honeycomb construction, the support wedge is resistant to distortion from forces applied normal to the inclined surface yet prone to some distortion from force normal to open sides and end sides.

The loading, unitizing and unloading of the parallel panels, such as multiple glazed insulating glazed units on/off the shipping container of FIG. 3 follows.

The loading operation requires that the rigid planar sheet which forms the rear wall 24, is of sufficient height to accommodate the correct vertical height of the panels. For example, the height of refrigerator doors when they are positioned on the support wedges. Once the properly sized rigid sheet of cardboard or plastic is fixed against the rear wall support member 19, to form the rear wall 24. Then each wedge 40 is positioned on the platform 23 with the lower back end 46 in contact with the rigid planar sheet 24, so that the inclined surface rises from the rear wall to the front of the shipping container. Each row of refrigerator doors 30, requires a pair of support wedges 40. The doors are loaded adjacent one another and parallel to the rear wall on each pair of support wedges where the bottom edges are normal to the inclined surface 41, and the top edges are urged to the rear wall 24. This provides a generally vertical position for the plurality of doors. As shown in FIG. 1, the shipping container 10 has located therein refrigerator doors, "F" 30 having a vacuum around their peripheral edges. Therefore, it is important that the doors are not exposed to edge forces that would separate the panes, and for their purpose the support wedges of this invention provide excellent protection. It is understood that shipping containers in accordance with this invention may have only one row of parallel panels, or may have two or more rows, the embodiment shown in FIG. 1 is for convenience, rather than limitation. The shipping container 10, can hold as many units as its size will allow and that size may vary greatly.

The unitizing phase of the loading operation is required for maintaining the stacked glazed units in a substantially vertical position on the shipping container when in transit. Lateral integrity is maintained for shipment by providing L-shaped corner posts of corrugated cardboard for each corner of the stacked load and thereafter employing conventional wraparound metal loading straps or fiberglass reinforced tapes. If the stacked doors or units are in contact with one another, it is preferable that they are separated by paper or cardboard spacers. The flexible bonding straps are routed around the rear wall support number 19 and the stacked units. Tension is placed on the bands to unitize the container. Once the container is unitized by tensioning, the resulting stack may be wrapped horizontally with heat-shrinkable plastic film additionally to stabilize the load. Suitable heat shrinkable plastic films are polyethylene and polyvinyl chloride.

Non-marring material may be added either to the surfaces contacting the panels or the panels themselves. The non-marring material can be rubber, paperboard, plastic foam, cloth or the like.

The unloading operation when the container is thus configured, wherein the multiple glazed units are exposed and easily accessible is both convenient and efficient to end user.

It will be understood that the use in the present specification and following claims of various directional terms such as "generally vertical", "upright", "lower", "bottom", "front", "back", "rear", "up", etc. refer to the general directions existing when the user is. Such terms are used to facilitate description and a clear understanding of the subject matter under discussion.

It will now be apparent to those skillful in the art that other embodiments, improvements, details and uses can be made consistent with the letter and spirit of the foregoing disclosure and within the scope of this patent which is limited only by the following claims construed in accordance with the patent statutes, including the doctrine of equivalents.

The embodiments of the invention in which an exclusive property or privilege is desired, is defined in the following claims.

What is claimed is:

1. In combination, a shipping container and a plurality of parallel panels of the same or varying sizes supported thereon, said container comprising:

a pallet having a horizontal base frame including a rigid planar platform area, a rear frame vertically attached to the base frame consisting of a pair of vertical support members in spaced relation to each other being connected by an upper horizontal cross-member and two vertical elongated support members which are detachably secured to the front of the base frame;

a rear wall support member fixed to the horizontal base and the upper back cross-member having an obtuse angle to said horizontal base frame wherein said rear wall support member is tilted obliquely and rearwardly from said horizontal base frame;

at least two support wedges having a load-bearing inclined surface positioned parallel and spaced apart on said planar platform wherein the angle of inclination increases from the rear wall to the front of the pallet and offsets the obtuse angle of the rear wall;

said wedges being freely laterally movably along the bottom edge of the panels;

at least one row of panels positioned parallel to the rear wall, parallel to and adjacent each other on said pair of wedges so as to have the bottom edge of the panels normal to the load bearing surface of the wedges and the side tope edge supported by the rear wall to provide a vertical upstanding position, whereby at least two wedges are used for each row of panels.

2. The combination of claim 1 including bonding means for securing the plurality of parallel panels by engaging the base frame and having its course over the pair of rear vertical support members to direct the panels toward the rear wall to secure the panels on the container.

3. The combination of claim 1 wherein said wedges are prismatic-shaped wedges and are constructed of paperboard having a laminated corrugated cardboard structure or a generally paperboard honeycomb structure.

4. The combination of claim 1 wherein parallel panels are frangible sheets.

5. The combination of claim 4 wherein said frangible sheets are selected from the group consisting of glass plate, vehicle windshields, mirrors and mounted paintings.

6. The combination of claim 5 wherein the parallel panels are a plurality of double-paned insulating glass structures.

7. The combination of claim 6 where said glass structures are selected from windows and doors.

8. The combination of claim 1 further containing non-marring materials at all surfaces contacting the panels.

9. The combination of claim 8 wherein said non-marring material is selected from the group consisting of rubber, paperboard, or plastic.

10. The combination of claim 1 wherein the obtuse angle is ninety-seven degrees and the angle of inclination is seven degrees.

11. The combination of claim 1 wherein the each paid or the wedges when parallel to each other are spaced apart whereby each row of rest on a portion of each wedge.

12. The combination of claim 1 wherein said bonding means includes at least one metal strap wrapped around the periphery of the container.

13. The combination of claim 12 further including a heat-shrinkable plastic film.

14. The combination of claim 13 wherein said heat-shrinkable plastic film is selected from polyethylene or polyvinyl chloride.

* * * * *